US007661817B2

(12) United States Patent
Ingram

(10) Patent No.: US 7,661,817 B2
(45) Date of Patent: Feb. 16, 2010

(54) INTEGRATED AUDIO EYEWEAR

(76) Inventor: Douglas S. Ingram, 4 Hertford, Newport Coast, CA (US) 92657

( * ) Notice: Subject to any disclaimer, the term of this patent is extended or adjusted under 35 U.S.C. 154(b) by 1082 days.

(21) Appl. No.: 11/262,463

(22) Filed: Oct. 28, 2005

(65) Prior Publication Data

US 2007/0098203 A1 May 3, 2007

(51) Int. Cl.
*G02C 1/00* (2006.01)
(52) U.S. Cl. ..................................................... 351/158
(58) Field of Classification Search ................. 351/158, 351/41, 111, 121
See application file for complete search history.

(56) References Cited

U.S. PATENT DOCUMENTS 4,882,769 A 11/1989 Gallimore
5,020,150 A 5/1991 Shannon
D352,300 S 11/1994 Gales
D353,387 S 12/1994 Peters
5,606,743 A 2/1997 Vogt et al.
5,608,808 A 3/1997 da Silva
5,715,323 A 2/1998 Walker
5,892,564 A 4/1999 Rahn
6,325,507 B1 12/2001 Jannard et al.
7,500,748 B1 * 3/2009 Liu ........................... 351/158

* cited by examiner

*Primary Examiner*—Hung X Dang
(74) *Attorney, Agent, or Firm*—Walter A. Hackler

(57) ABSTRACT

Eyewear includes a lens supporting frame along with temple pieces extending therefrom with at least one of the temple pieces including an open sided chamber sized for receiving an audio unit having communication socket disposed at one end of the audio unit. The open side enables access to the controls disposed on one side of the audio unit. A cover is provided for moving the audio unit within the chamber in order to engage the socket with a plug and removably affixed the audio unit within the temple piece chamber.

12 Claims, 3 Drawing Sheets

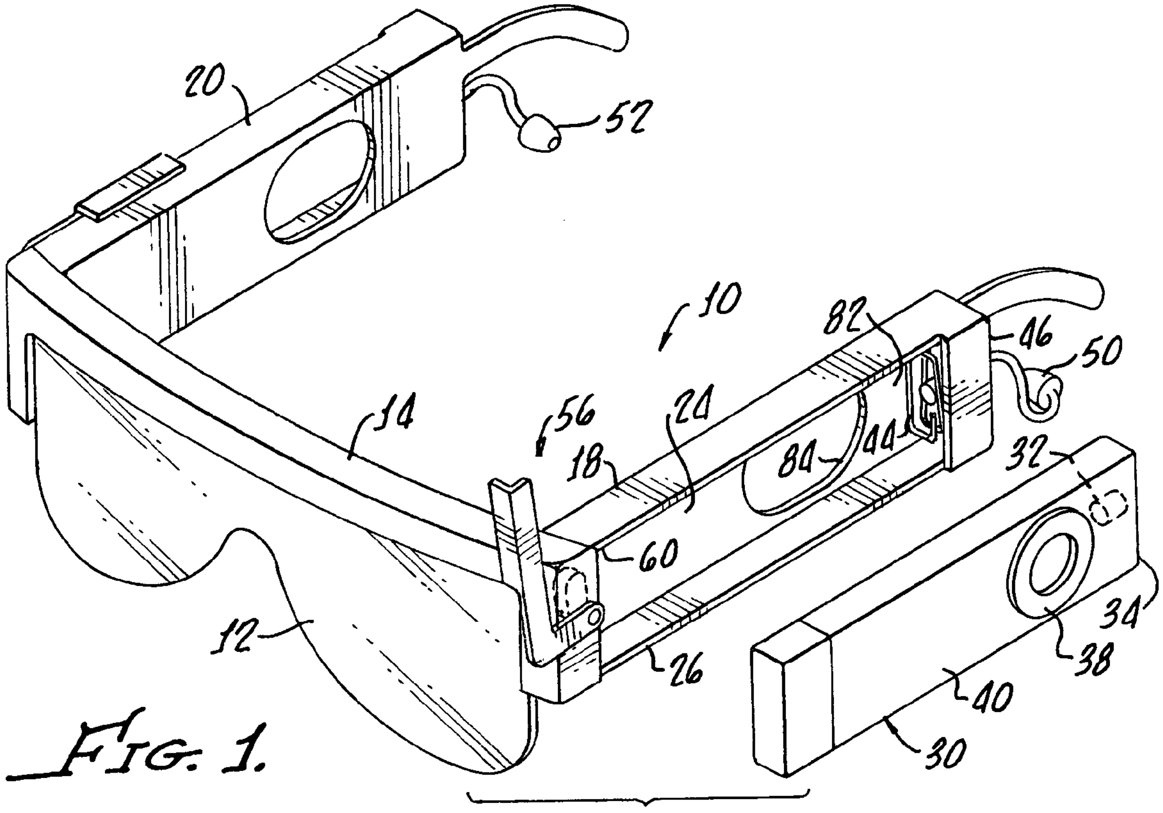
FIG. 1.
FIG. 2.
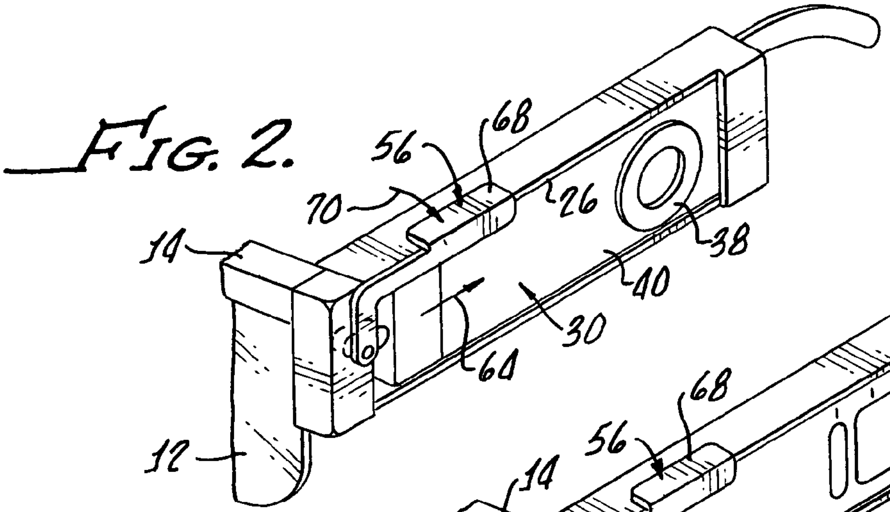
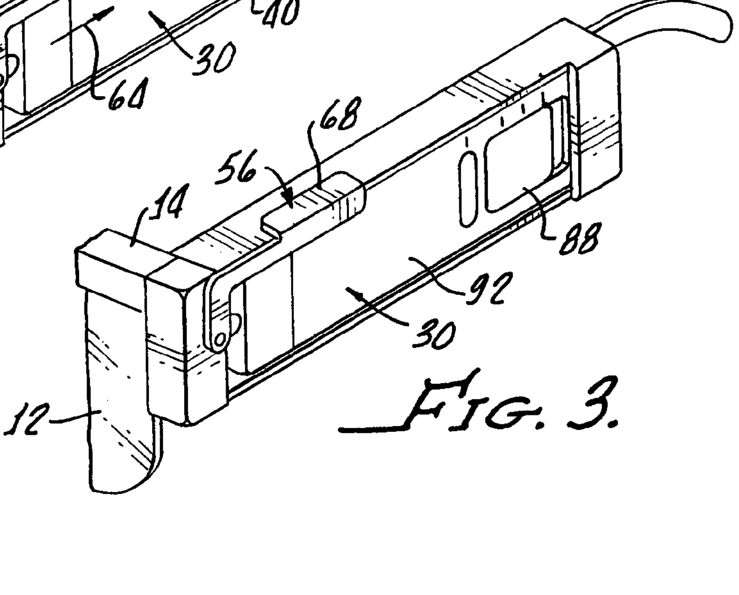
FIG. 3.

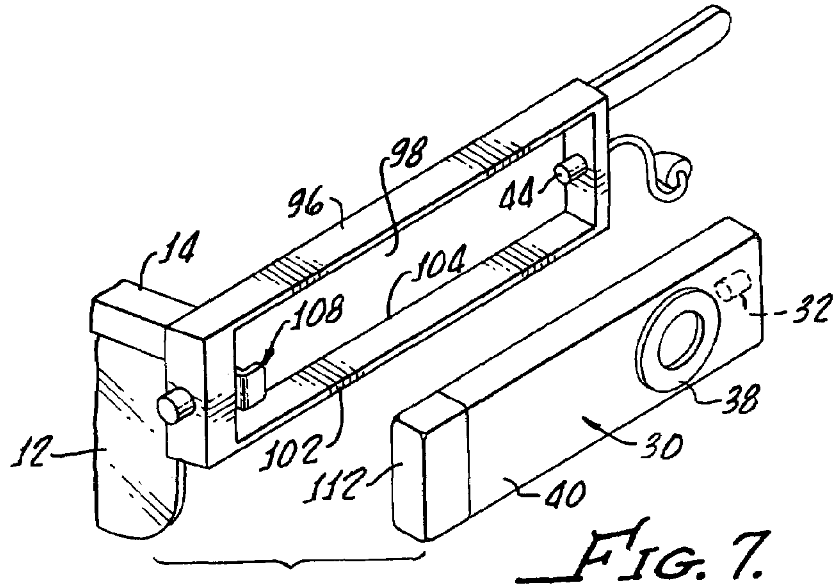
FIG. 7.
FIG. 8.
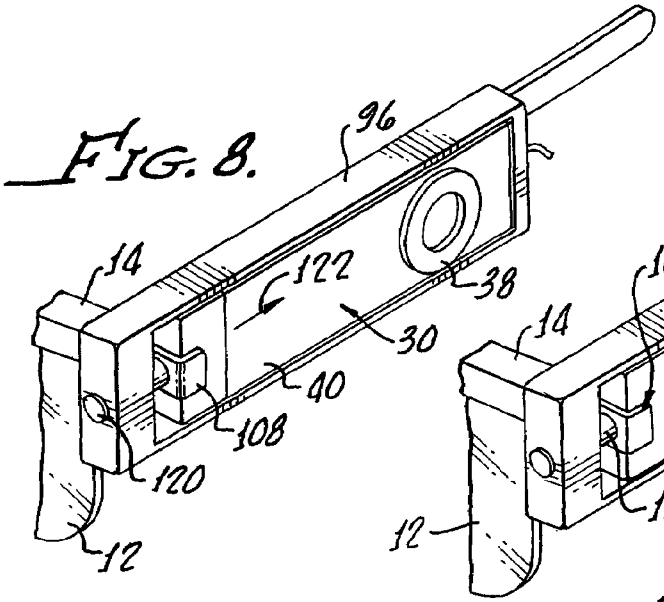
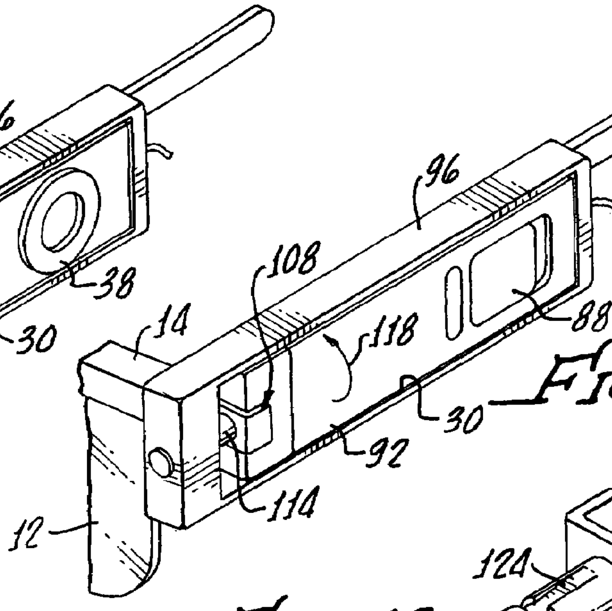
FIG. 9.
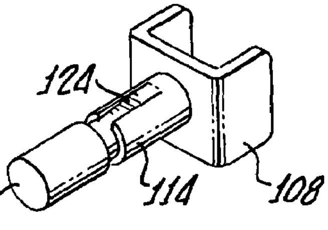
FIG. 12.
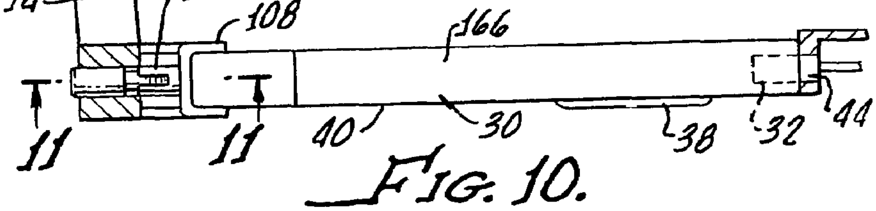
FIG. 10.
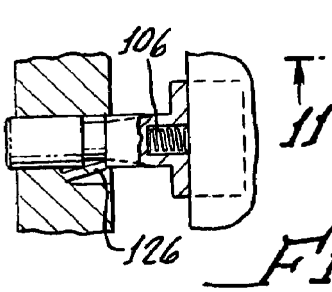
FIG. 11.

INTEGRATED AUDIO EYEWEAR

The universal appeal of music and music have led to the development of miniature communication devices including cell phones and portable music players and storage devices such as the MP3 player and the iPod®.

Consumer acceptance and demand for these devices is driven by their convenience, versatility, and increasingly lightweight small size.

Such devices are often use by individuals who enjoy activities such as jogging, walking, and the like. Typically, such devices are utilized with a pair of earphones. Incorporation of miniature radios and devices into spectacles has long been a desirable combination. However, it is also desirable to have access to controls on the device which, in the case of the iPod®, for example, are disposed in opposite sides of the device.

The present invention provides for eyewear for enabling the temporary incorporation of an iPod® type device, while at the same time enabling access to all controls of such a device.

SUMMARY OF THE INVENTION

Eyewear in accordance with the present invention generally includes a lens supporting frame along with temple pieces extending from opposite sides of the frame.

At least one temple piece includes an open sided chamber sized for receiving an audio unit having a communication socket disposed at one end thereof. The open side enables access to controls disposed on one side of the audio unit.

At least one plug disposed at one end of the chamber is provided and aligned with the communication socket upon insertion of the audio unit into the chamber. A coupler is provided for moving the audio unit within the chamber in order to engage the socket with the plug and removably affixed the audio unit within the temple piece chamber.

More particularly, a spring may be provided and disposed adjacent to plug for disengaging a plug from the socket upon reverse movement of the coupler.

In order to provide access to both sides of the audio device, a temple side to the temple piece chamber includes an opening for enabling access to such controls disposed on the opposite side of the audio unit.

Preferably, each temple piece includes an open sided chamber size for receiving the audio unit with each chamber including at least one corresponding plug disposed at an end of a corresponding chamber and aligned with the socket upon insertion of the audio unit into the corresponding chamber.

A second coupler is provided for moving the audio unit within the corresponding chamber in order to engage the socket with the corresponding plug. In this manner, the unit may be moved from on temple piece to another which facilitates the use of the eye piece in accordance with the present invention by right and left handed persons.

Another embodiment of the present invention includes couplers which having a spring loaded fitting sized for engaging an opposite end of the audio unit and rotatable about a support rod.

The support rod is disposed along an axis shared by the plug, thus enabling rotation of the audio device about the axis and within the chamber. In this embodiment, the opposite sides of the device are accessible by rotating of the audio unit within the temple piece typically facilitated by temporarily removing the eyewear from a person.

BRIEF DESCRIPTION OF THE DRAWINGS

The present invention may be more clearly appreciated when taken in conjunction with the accompanying drawings, in which:

FIG. 1 is a perspective view of eyewear in accordance with the present invention generally showing a lens supporting frame with temple pieces extending therefrom and an open sided chamber with a plug disposed at one end thereof and a coupler for moving an audio unit within the chamber;

FIG. 2 is a perspective view of a temple piece similar to that shown in FIG. 1 showing the audio unit engaged within the chamber with one side thereof being exposed for control access;

FIG. 3 is a view similar to that shown in FIG. 2 with the audio device inserted with access to controls on an opposite side of the audio device;

FIG. 7 is a perspective view of an alternative embodiment of the present invention generally showing a temple piece with a chamber therein, a spring loaded fitting therein for engaging the audio unit and enabling the rotation thereof within the temple piece chamber;

FIG. 8 is a perspective view similar to that shown in FIG. 7 with the audio unit installed within the temple piece chamber;

FIG. 9 is a view similar to that shown in FIG. 8 with the audio unit rotated to enable access to controls disposed on an opposite side thereof;

FIG. 10 is an elevation of a cross sectional view of the embodiment shown in FIGS. 7-9;

FIG. 11 is a cross sectional view taken on the line 11-11 of FIG. 10; and FIG. 12 is en enlarged perspective view of the fittings shown in FIGS. 7-9.

DETAILED DESCRIPTION

Figure 4:
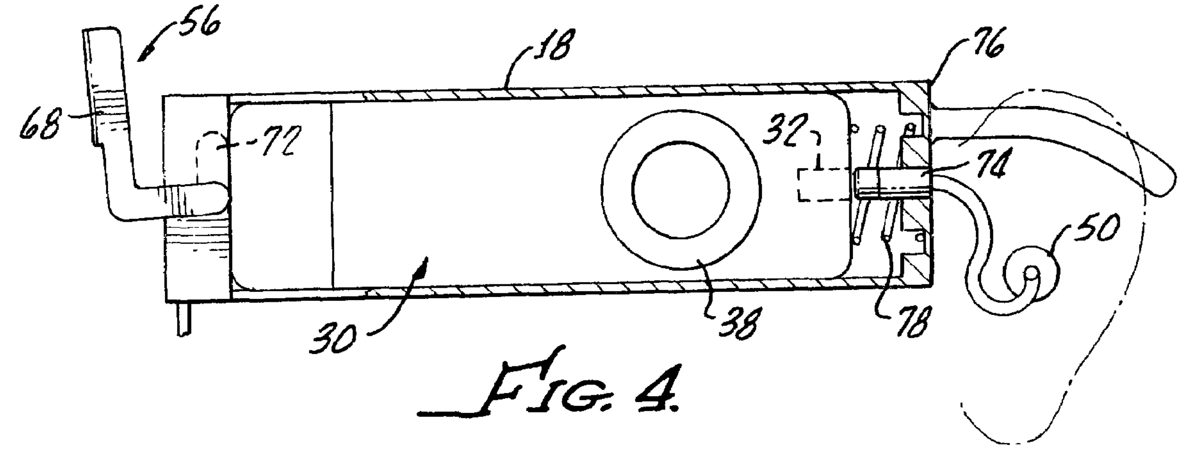
FIG. 4 is a cross sectional view of the temple piece illustrating the audio device disposed in the chamber before actuation of the coupler for engaging a plug with the communication socket in the audio device.

With reference to FIG. 1, there is shown eyewear 10 showing a lens 12 supporting frame 14 with the frame 14 including temple pieces 18, 20 extending therefrom and connected thereto in a conventional manner.

It should be appreciated that the frame 14, lenses 12, and temple pieces 18, 20 are illustrated in a functional form and any design configuration preferable by style sensitive individuals is to be incorporated herewith and considered alternative embodiments of the present invention.

In the current description of the invention only one of the temple pieces 18 is described it being appreciated that the other temple piece 20 is substantially identical and all descriptions apply to both the temple pieces 18, 20.

In that regard, the temple piece 18 includes a chamber 24 having an open side 26 sized for receiving an audio unit having a communication socket 32 disposed at one end 34 of the audio unit 30.

As clearly illustrated in FIG. 2, the open side 26 of the chamber 30 enables access to controls 38 disposed on one side 40 of the audio unit 30.

The audio unit 30 may be of any suitable type as, for example, as a specific example only, an iPod®, model M9724 LL/A available from Apple Computers, Inc. With reference again to FIG. 1, at least one plug 44 is disposed at an end 46 of the chamber 24 and aligned with the socket 32 upon insertion of the audio unit 30 into the chamber 24, as illustrated in FIGS. 3-6.

The plug is interconnected with a conventional speaker/earplug audio output device 50 in a conventional manner with wires (not shown) and extending through the frame 14 for coupling a corresponding audio output device 52 and corresponding temple piece 20.

A coupler 56 disposed at an opposite end 60 of the chamber 24 is provided for moving the audio unit 30 within the chamber 24, as indicated by the arrow 64 in FIG. 2, to engage the socket 32 with the plug 44, thus removably fixing the audio unit 32 within the temple piece chamber 24.

Movement of a coupler 56 lever arm in the direction of arrow 70 rotates a pin 72 indicated by the arrow 74 in FIG. 5 to effect the hereinabove described movement.

Figure 5:
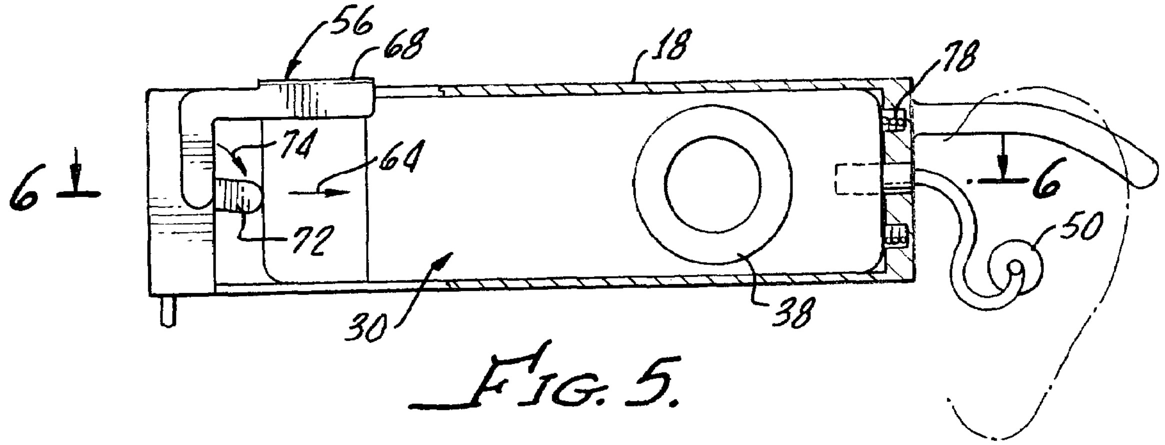
FIG. 5 is a cross sectional view similar to that shown in FIG. 4 illustrating the coupler moving the audio device in order to insert the plug into the socket.
Figure 6:
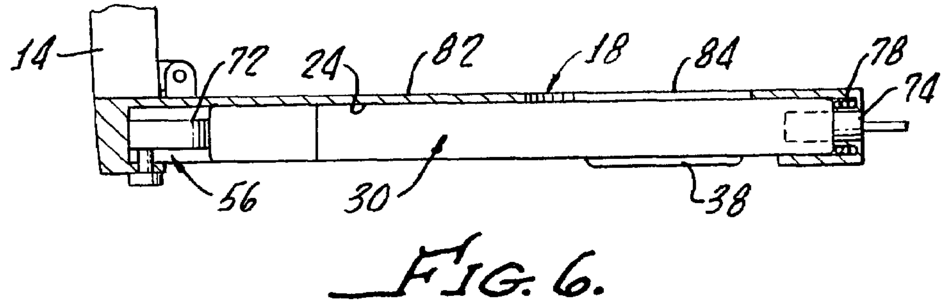
FIG. 6 is a cross sectional view taken along the line 6-6 of FIG. 5.

As most clearly illustrated in FIGS. 4-6, a spring 78 preferably disposed about the plug 44 biases the audio unit 30 and facilitates disengagement between the plug 74 and the socket 32 upon reverse of movement of the coupler 64, lever arm 60, and pin 72.

With reference again the FIG. 1, a temple side 82 may include an opening 84 for enabling access to other controls 88 when the audio device is inserted in a rotated 180° position, as illustrated in FIG. 3. Accordingly, the audio device 30 need not be removed from the temple piece 18 for access to controls 38, 88 disposed on opposite sides 40, 92 of the audio unit 30.

Alternatively, for the convenience of left/right handed persons, the audio device 40 may be installed in the temple piece 20 with the same functional benefits.

While not shown, a cover piece may be provided for enclosing the chamber 24 in a decorative manner when the audio device 30 is disposed in the opposing temple piece 20.

With reference to FIGS. 7-12, there is shown an alternative embodiment temple piece 96 having a two open sides 102, 104 for enabling access to controls 38, 88 of the audio unit 30. Common reference characters represent identical or substantially similar components hereinabove described.

The temple piece 96 includes a spring 106, loaded fitting 108 for engaging an opposite end 112, the audio unit 30 which is rotatable aloud via support rod 114.

A support rod 114 is disposed along an axis 116 shared by the plug 44 which enables rotation of the audio device 30 about the axis 116 and within the chamber 98, as illustrated by the arrow 118.

After insertion of the audio device 30 into the chamber 98, the rod 114 is moved by depression of an end 120 of the rod to lock the audio unit 30 in position, as indicated by arrow 122 in FIG. 8. The rod 114 includes a depression 114, which receives a tab 126, see FIG. 11, for allowing the audio unit in the chamber 98 between the plug 44 and fitting 108.

Subsequent depression of the end 140 and rotation by thumb contact releases the tip 126 from the depression 124 enabling the spring 108 to push the rod 114 and fitting 108 in a direction opposite to the arrow 112 thus releasing the audio unit for facilitating removal thereof.

Although there has been hereinabove described specific eyewear in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. Eyewear comprising:

a lens supporting frame;

temple pieces extending from opposite sides of the frame;

at least one of the temple pieces including an open sided chamber sized for receiving an audio unit having a communication socket disposed at one end of said audio unit, the open side enabling access to controls disposed on one side of said audio unit;

at least one plug disposed at one end of said chamber and aligned with the socket upon insertion of said audio unit into said chamber; and a coupler for moving said audio unit within said chamber in order to engage the socket with the plug and removably affixed said audio unit within the temple piece chamber.

2. The eyewear according to claim 1 further comprising a spring, disposed adjacent said plug for disengaging the plug from the socket upon reverse movement of said coupler.

3. The eyewear according to claim 1 wherein a temple side of the temple piece chamber includes an opening to enable access to other controls disposed on an opposite side of said audio unit.

4. The eyewear according to claim 1 wherein each temple piece includes an open sided chamber sized for receiving said audio unit, each chamber includes at least one corresponding plug disposed at an end of a corresponding chamber and aligned with the socket upon insertion of said audio unit into the corresponding chamber and a second coupler for moving said audio unit within a corresponding chamber in order to engage the socket with the corresponding plug and removably affix said audio unit within the corresponding temple chamber.

5. The eyewear according to claim 1 wherein said coupler comprises a lever mechanism.

6. The eyewear according to claim 1 wherein said coupler comprises a spring loaded fitting sized for engaging an opposite end of said audio unit and rotatable about a support rod, said support rod being disposed along an axis shroud by the plug and enabling rotation of said audio device about said axis and within the chamber.

7. The eyewear according to claim 1 wherein said couplers comprises a lever mechanisms.

8. Eyewear comprising:

a lens supporting frame;

temple pieces extending from opposite sides of the frame;

each temple pieces including an open sided chamber sized for receiving an audio unit having a communication socket disposed at one end of said audio unit, the open side enabling access to controls disposed on one side of said audio unit;

at least one plug disposed at one end of each chamber and aligned with the socket upon insertion of said audio unit into one of the chambers; and couplers for moving said audio unit within each chamber in order to engage the socket with the plug and removably affixed said audio unit within one of the temple piece chamber.

9. The eyewear according to claim 8 further comprising a springs, disposed adjacent said plug for disengaging the plug from the socket upon reverse movement of said coupler.

10. The eyewear according to claim 8 wherein a temple side of each temple piece chamber includes an opening to enable access to other controls disposed on an opposite side of said audio unit.

11. The eyewear according to claim 8 wherein each couplers comprises a spring loaded fitting sized for engaging an opposite end of said audio unit and rotatable about a support rod, said support rod being disposed along an axis shared by the plug and enabling rotation of said audio device about said axis and within the chamber.

12. Eyewear comprising:

a lens supporting frame;

temple pieces extends from opposite sides of the frame;

at least one of the temple pieces including an open sided chamber sized for receiving an audio unit having a connect socket disposed at one end of said audio unit, the open side enabling access to controls disposed on one side of said audio unit;

at least one plug disposed at one end of said chamber and aligned with the socket upon insertion of said audio unit into said chamber; and a coupler comprising a spring loaded fitting sized for engaging an opposite end of said audio unit and reloadable about a support rod, said support rod being disposed along an axis shared by the plug and enabling rotation of said audio unit about said axis and within the chamber to enable access to other controls disposed on an opposite side of said audio unit.

* * * * *